Inventors
GEORGE P. TORRENCE
RICHARD F. BERGMANN
WALTER F. KNEBUSCH

Inventors
GEORGE P. TORRENCE
RICHARD F. BERGMANN
WALTER F. KNEBUSCH
By Charles E. Herrstrom
Attorney Oct. 15, 1940.  G. P. TORRENCE ET AL  2,217,716
THREAD ADVANCING REEL
Filed Dec. 27, 1938  5 Sheets-Sheet 3

Inventors
GEORGE P. TORRENCE
RICHARD F. BERGMANN
WALTER F. KNEBUSCH
BY Charles E. Herrstrom
Attorney

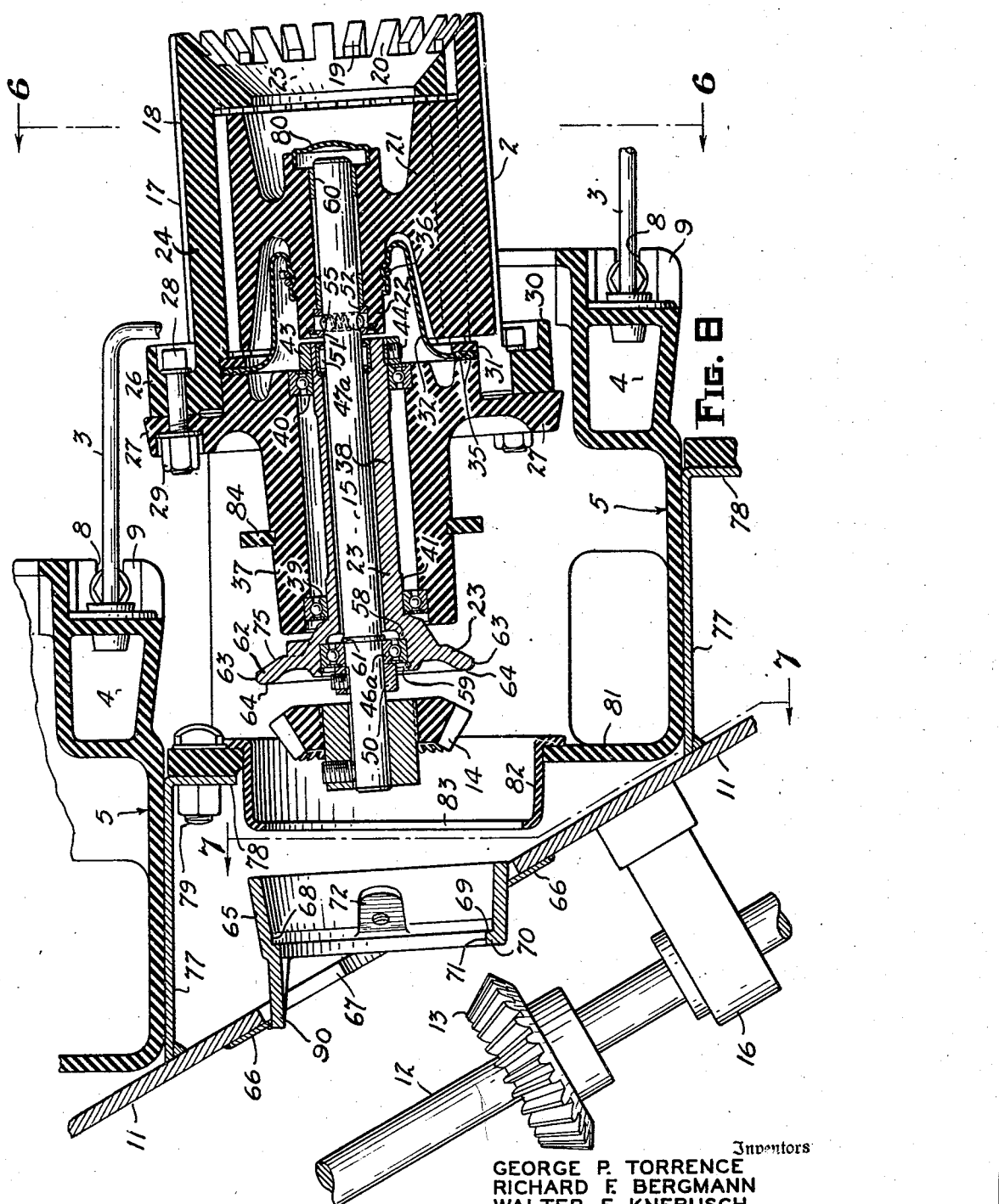

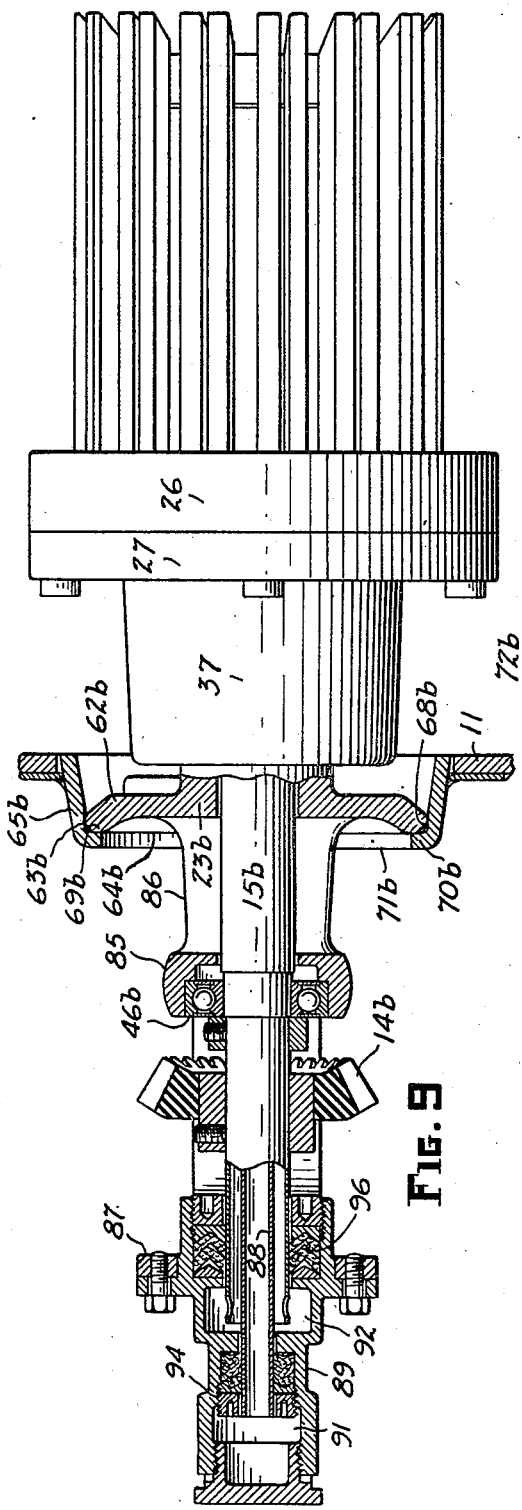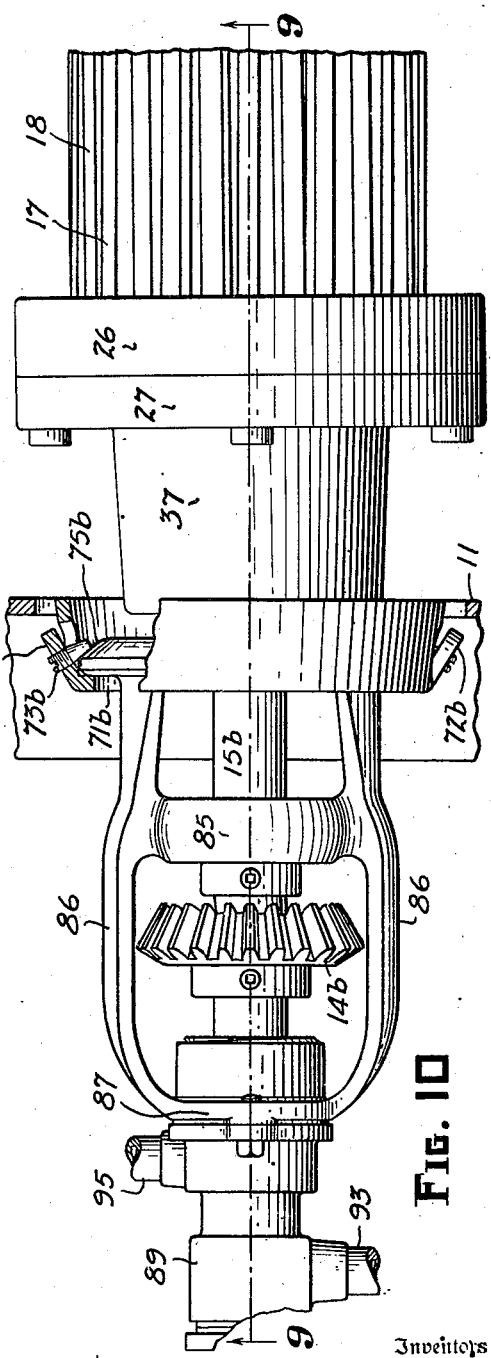
Inventors
GEORGE P. TORRENCE
RICHARD F. BERGMANN
WALTER F. KNEBUSCH Patented Oct. 15, 1940

2,217,716

UNITED STATES PATENT OFFICE 2,217,716

THREAD ADVANCING REEL

George P. Torrence, Shaker Heights, Richard F. Bergmann, Lakewood, and Walter F. Knebusch, Rocky River, Ohio, assignors to Industrial Rayon Corporation, Cleveland, Ohio, a corporation of Delaware Application December 27, 1938, Serial No. 247,800

22 Claims. (Cl. 242—53)

The present invention relates to improvements in devices, such as reels, for advancing thread or the like, hereinafter referred to as "thread," in a series of spaced, generally helical turns. While such devices may be employed for various purposes, they may be used to especial advantage in continuous processing operations, wherein they lend themselves to employment for continuously but temporarily storing relatively long lengths of thread. In particular, the invention provides improvements in such devices resulting in greatly reduced manufacturing costs, maintenance costs, and costs of operation. Among other things, the invention provides means whereby such devices may be readily mounted on and removed from the frame structure in which they are supported.

Other features of the invention will be apparent from the following description taken with the accompanying drawings.

The improvements of the present invention are particularly applicable to devices operating on the principle of the reel shown, described and claimed in copending application Serial No. 652,089, filed January 16, 1933, by Walter F. Knebusch. For purposes of illustration, but in no sense of limitation, reels embodying the present invention will be described hereinafter as employed in apparatus for the continuous processing of thread; e. g., viscose artificial silk thread, of the type shown, described and claimed in application Serial No. 7,114, filed February 18, 1935, by Walter F. Knebusch and Alden H. Burkholder.

Figure 1:
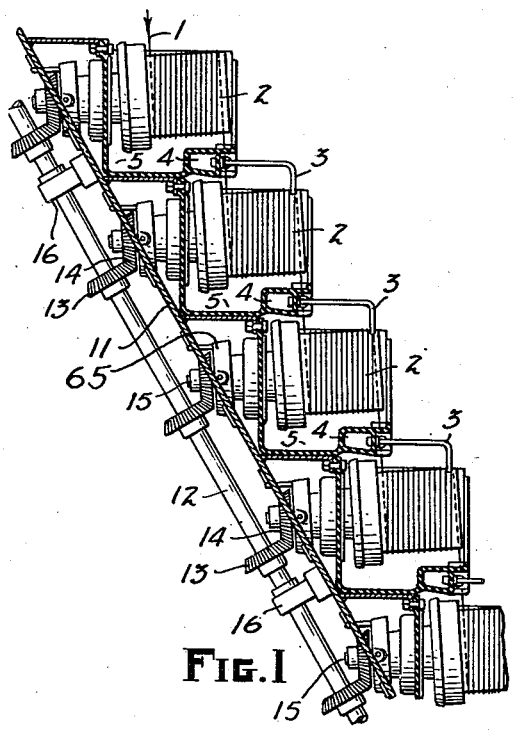
Figure 2:
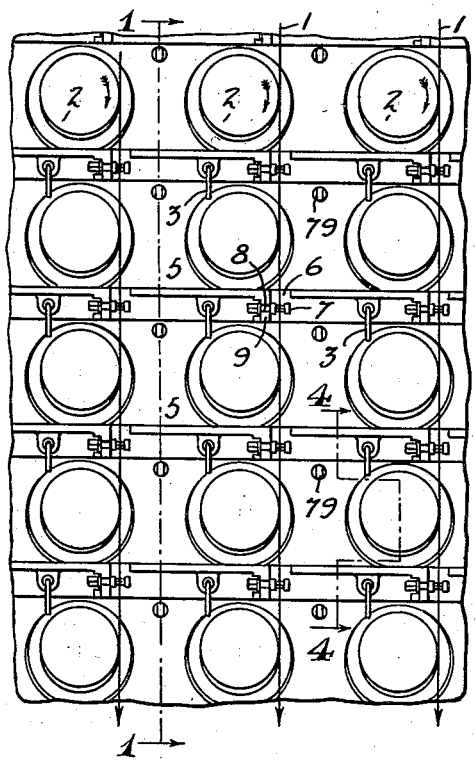
Figure 3:
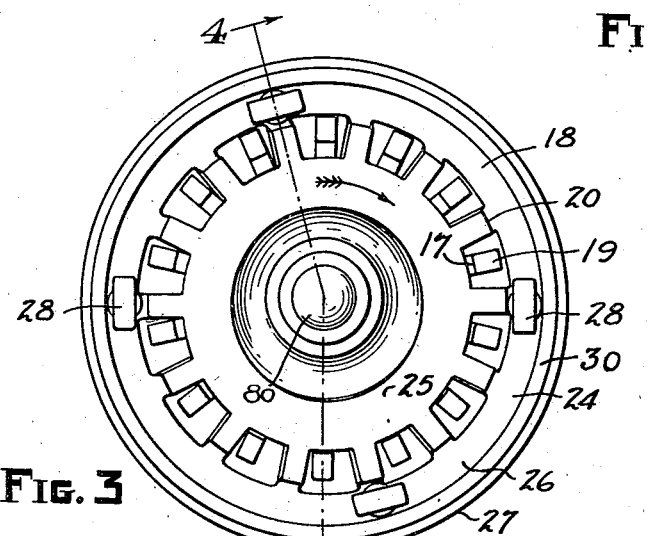
Figures 4, 5:
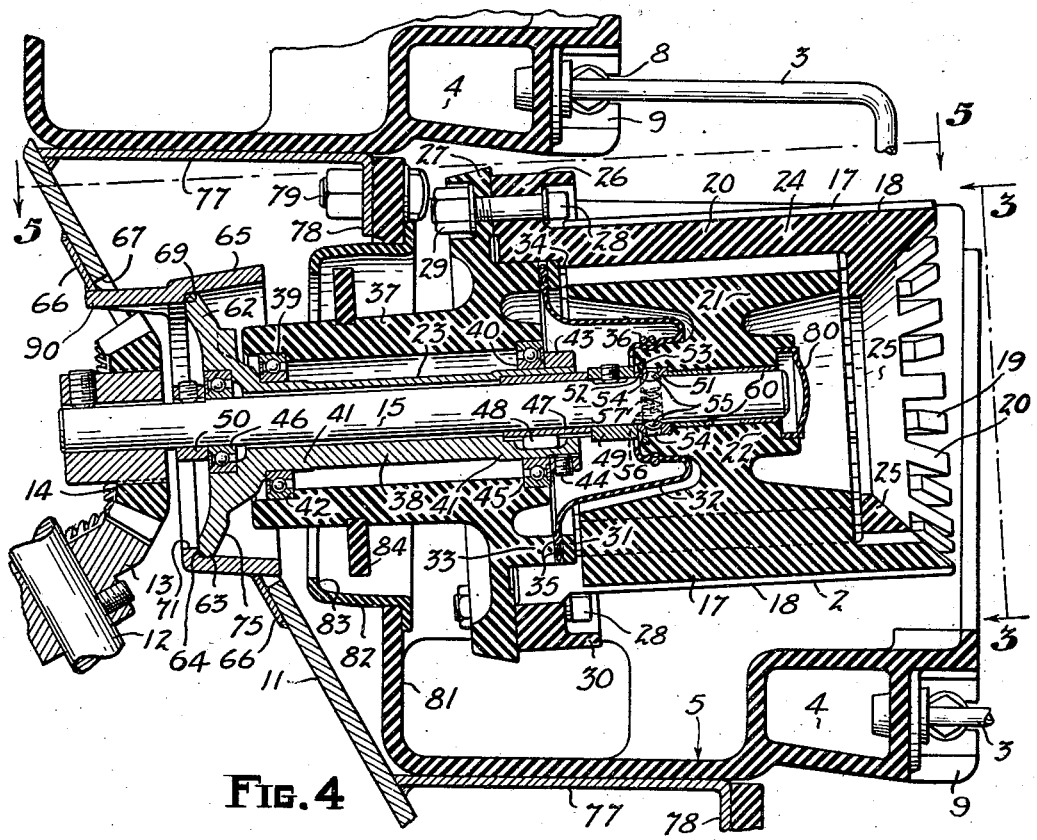

In the drawings, Figure 1 represents a sectional elevation, along line 1—1 of Figure 2, of a portion of a continuous processing machine employing reels embodying the present invention. Figure 2 is a front elevation corresponding to Figure 1. Figure 3 is an end elevation from line 3—3 of Figure 4 and on an enlarged scale of a reel embodying the invention. Figure 4 is a sectional elevation on an enlarged scale of a portion of the continuous processing apparatus showing in section a reel embodying the improvements of the present invention, the section through the apparatus as a whole being from line 4—4 of Figure 2 and the section through the reel itself being from line 4—4 of Figure 3. Figure 5 is a plan of the reel from line 5—5 of Figure 4, associated parts other than the supporting means for the reel being omitted for the sake of clearness.

Figure 6:
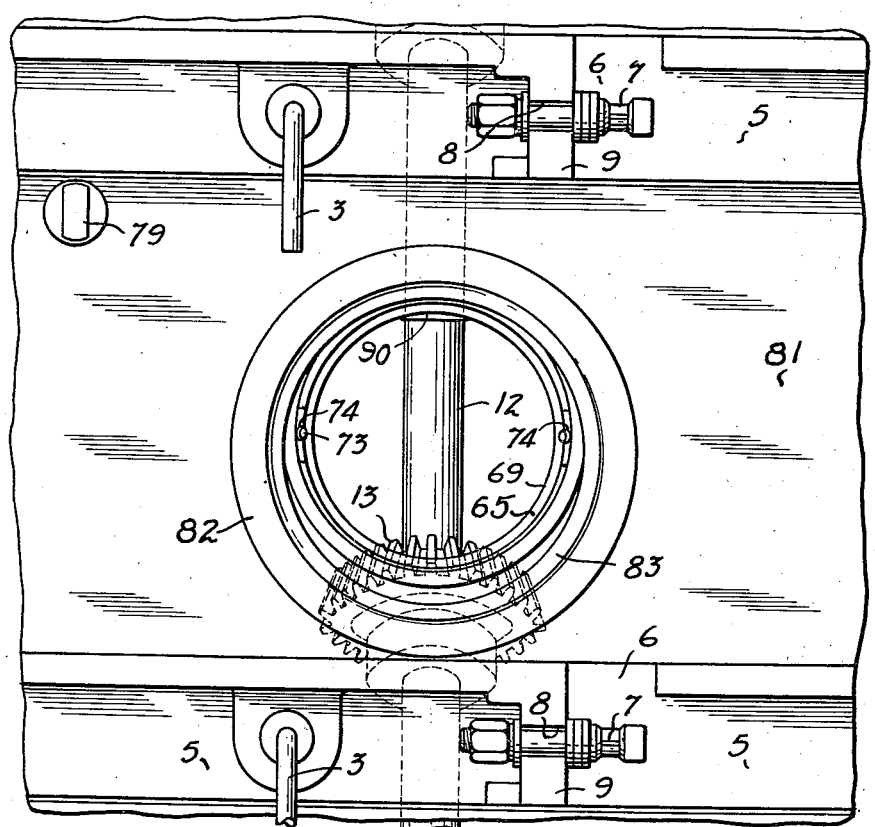
Figure 7:
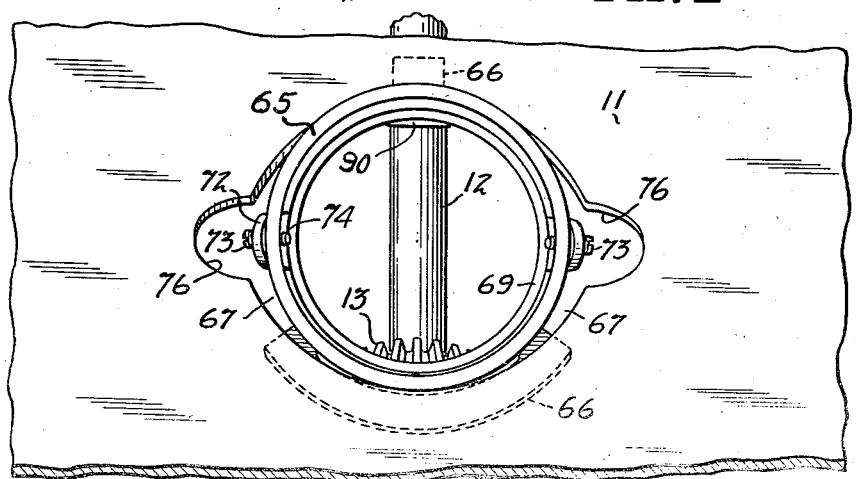

Figure 6 is a front elevation of the portion of the apparatus shown in Figure 4 with the reel removed, showing the mounting means. Figure 7 is a similar front elevation of the apparatus showing the mounting means, associated apparatus, however, having been omitted. Figure 8 is a sectional elevation generally similar to Figure 4 showing a reel embodying the invention partly removed from its mounting means, the reel of this figure being a modification of the reel of Figure 4. Figure 9 is an elevation of another form of reel embodying the mounting means of the present invention, parts being broken away generally along line 9—9 of Figure 10. Figure 10 is a plan of the reel of Figure 9.

In the drawings, like reference characters refer to like parts throughout.

In the apparatus illustrated in Figures 1 to 8, inclusive, thread $t$ from a suitable source is passed in sequence to a plurality of thread-advancing reels 2 on each of which the thread is subjected to processing treatment. In the case of viscose artificial silk thread, for instance, the thread may be subjected in sequence to desulphurizing, washing, bleaching and other processing treatments on the several thread-advancing reels of the series. The illustrated apparatus is generally similar to that shown in the above-mentioned prior application Serial No. 7,114, particularly in that the apparatus as a whole comprises a plurality of adjacent downwardly extending series of thread-advancing reels each of which series operates upon a single thread. Corresponding reels of adjacent series are disposed in corresponding positions lengthwise of the machine as a whole, whereby advantages are provided in the construction of the apparatus.

The reels shown in the illustrated apparatus are of cantilever construction; that is, each is supported and driven from one end only, having its other end unsupported. Each advances the thread toward the unsupported end of the reel in generally helical turns. Numerous advantages are provided by the cantilever construction of the reels, among them easy access to the reel for starting the thread on the reel and ease of transferring the thread to the succeeding device, etc. Moreover, the cantilever construction of the reels makes it possible to dispose them as shown in Figure 1 in stepped arrangement with the unsupported end of each reel in apposite relation to the supported end of the succeeding reel, corresponding ends of all reels extending in the same direction. Such an arrangement provides numerous advantages, among them simplicity, compactness and easy accessibility for operating, inspection, and maintenance purposes.

In the illustrated apparatus, processing liquid is supplied to the thread on each reel from a tube 3 which communicates with a conduit 4 extending lengthwise of the machine and serving corresponding reels in adjacent downwardly extending series. The processing liquid thus applied to the thread on each reel, particularly when the reels are inclined somewhat from the horizontal as shown, may be caused to form a film which extends completely around and over all of the turns of thread on the reel, the liquid in such film traveling toward the supported end of the reel as a result of the inclination of the reel.

The liquid thus applied to the thread on the reel drops off into a collecting trough 5. Each trough 5 extends longitudinally beneath a plurality of corresponding reels in adjacent series, the liquid collected by said trough being conveyed to the sewer or, if desired, recirculated. In the illustrated embodiment of the invention, the trough 5 below each horizontal series of corresponding reels is molded of hard rubber, Bakelite, or some other suitable resin. Formed integrally with it is a conduit 4 for supplying processing liquid to the reels in the succeeding horizontal series. Each trough 5 is formed with a recess 6 below the unsupported end of each reel through which recess the thread can pass to the succeeding reel. Associated with each recess 6 is a guide 7 mounted in a slot 8 in a flange 9 formed integrally with trough 5.

The reels may, if desired, be supported as shown from inclined frame member 11. Each of the reels in each descending processing series may be driven from an upwardly extending drive shaft 12 paralleling said inclined frame member, as, for example, by means of a gear 13 mounted on said drive shaft 12 which meshes with a gear 14 mounted on reel drive shaft 15. The drive shafts 12 for each series of reels may be rotatably supported from the frame member 11 by bearings 16, being driven by suitable means (not shown).

The reels illustrated in the drawings as embodying the improvements of the present invention operate on the same principle as the reel shown, described and claimed in copending application Serial No. 652,089. The reel illustrated in Figures 3 to 5 comprises two rigid reel members of substantially circular cross section, each having its periphery formed of a plurality of spaced, longitudinally extending bar members. The bar members 19 of reel member 17 and bar members 20 of reel member 18 are alternately disposed, the two reel members being mounted for rotation about axes which are offset from and inclined to each other. In the illustrated embodiment of the invention, the axes of the two reel members are disposed in inclined relation to each other in offset, parallel planes, so that the axes may be said to be in skew relation.

Preferably, the spaced, longitudinally extending bar members 19 of reel member 17 are fixed to a generally cylindrical body portion 21, as a result of which construction great rigidity is imparted to the reel member. Body portion 21 may be partially hollowed as shown for the purposes of reducing its weight, leaving a hub portion 22 by means of which the reel member 17 is concentrically mounted on reel drive shaft 15 journalled in the supporting member 23. Since reel member 17 is concentrically mounted on drive shaft 15, it may accurately be referred to as being the concentric reel member.

The other reel member 18, which may, if desired, be termed the eccentric reel member, has its bar members 20 formed as part of a rigid, cage-like member 24. In said cage-like member 24 the bar members 20 are fixed to an internal annular reinforcing rib 25 at the unsupported end of the reel, which rib serves to impart rigidity to the bar members. At the other end of said cage-like member 24 the bar members 20 are fixed to an external annular rib 26 which also imparts rigidity to the bar members and serves as a means by which the cage-like member 24 is mounted on the rotatable annular supporting member 27.

In the illustrated embodiment of the invention, the rigid cage-like member 24 is clamped on annular supporting member 27 by means of the T-head bolts 28 which pass through external annular rib 26 and the flange of said annular member 27 and are provided with nuts 29 at the back of said annular member 27. The external rib 26 is provided with a projecting rib 30 which extends over the ends of bar members 19 of concentric reel member and prevents thread passing to the reel from entangling at the rear of the reel. To facilitate this thread-guiding function, the heads of bolts 28 are formed so that they do not project beyond the rib 30. The annular member is preferably provided with a shoulder which impedes the flow of liquid along the outer surfaces of rib 26 and annular member 27.

A flexible seal 32, which may be made of any soft rubber-like material resistant to the processing liquids and lubricants which may come into contact with it, extends between the eccentric and concentric members. The outer rim of the flexible seal 32, which may be of the cup-shaped bellows form shown, may conveniently be clamped between the front face of the flange portion 33 on annular supporting member 27 and the shoulders 34 on bar members 20 of cage member 24. It may be provided with one or more annular ridges 35 to aid in providing an impervious joint at this point, a suitable annular ring or washer 31 being provided between the rim of the seal 32 and the shoulders 34 on the bar members of the cage-like member 24 to equalize the pressure on the sealing means. The other end of the seal 32 is shown as mounted on the hub portion 22 of the concentric member, a suitable spring ring 36 being provided to clamp it in place.

In the embodiment of the invention illustrated in Figures 3 to 5, inclusive, the annular supporting member 27 disposed at the rear of the reel is provided with a longitudinally extending hub portion 37 having a bore therethrough surrounding the member 23 which supports the reel. The supporting member 23 of the reel of these figures is provided with a longitudinally projecting hub portion 38 adapted to accommodate thereon the inner races of antifriction bearings 39 and 40 disposed for rotation about a common axis offset from and inclined in the desired relation to the axis of the drive shaft 15. The external surface of said projecting portion 38 may be of substantially cylindrical form throughout its length and may, as shown, be provided with raised portions 41 which may be ground to fit the inner races of the bearings 39 and 40 which may be passed over the end of supporting member 23 in assembly. The outer races of said spaced antifriction bearings 39 and 40 are concentrically mounted in recesses in the hub portion 37 of the annular member 27 forming part of the generally cylindrical eccentric reel member 18.

In the embodiment shown, the rear antifriction bearing 39 is located between a shoulder on supporting member 23 and a shoulder 42 in the hub portion 37. A collar 43, provided with a set screw 44, is mounted at the unsupported end of member 23 to locate the other antifriction bearing 40 against shoulder 45 in annular supporting member 27. Thus the eccentric member 18 is rotatably mounted on and accurately located lengthwise of the supporting member 23.

In this embodiment of the invention, the reel drive shaft 15 is journalled in supporting member 23 by antifriction bearings 46 and a bearing 47 at the unsupported end of said supporting member. In order to make it possible to use bearings of as small a size as practicable, since the cost of such bearings increases with the size thereof, the rear bearing 46 is disposed in supporting member 23 outside the limits of the hub portion 37 of the eccentric reel member as shown. The front bearing 47 for the drive shaft 15 is of a diameter small enough to be contained within the portion of member 23 disposed within bearing 40.

In the embodiment of the invention shown in section in Figure 4, this bearing 47 is a sleeve bearing which is fixed in the supporting member 23 by a key 48. While this bearing may be formed of any suitable bearing material, it is preferably a lubricant-impregnated metal bearing, such as graphite bronze, since under such circumstances it is not necessary to provide special lubricating means. In the embodiment of the invention shown in this figure, suitable collars 49 and 50 are mounted on said shaft, as by means of set screws, to locate shaft 15 endwise with respect to the supporting member 23.

The antifriction bearings illustrated are ball bearings of the self-lubricated type, being packed with lubricant when the reel is assembled. This is advantageous since thus the necessity for providing a separate lubricating system for the bearings is obviated. It has been found that such a lubricating system would considerably increase the cost of construction and maintenance of the machine. For instance, such a lubricating system would require lubricant passages in the supporting member 23, which in itself would increase the cost of construction of the reel, and would necessitate the employment of larger and considerably more costly bearings 39 and 40, due to the fact that it would be necessary to make the projecting portion 38 of the supporting member 23 of a larger diameter to provide space for such lubricant passages.

Moreover, the antifriction bearings may be of the self-sealed type shown. In the illustrated reels, for instance, the rear antifriction bearing 39 supporting the eccentric reel member is sealed on the side thereof facing the rear end of the hub portion 37, while the other antifriction bearing 40 supporting the eccentric reel member is sealed on the side thereof facing the unsupported end of the reel, so that in effect the balls of said antifriction bearings and the space between them are totally enclosed. Thus, the bearings are protected and escape of lubricant is prevented, which, aside from the difficulties caused by the necessity for replenishment of such lubricant, might result in contamination of the thread on the reel.

It is possible, if desired, to place lubricant inside the hub portion 38 in the space between these bearings at the time of assembly of the reel. Such lubricant cannot escape in the design of the reel provided by the present invention and need not be replaced or replenished for long periods of time, if at all. Antifriction bearing 46 for the drive shaft 15 may also be of the self-lubricated type and be sealed, as shown, on the side thereof facing the rear of the supporting member 23, so that it and the space between it and bearing 47 may be totally enclosed. A supply of lubricant may also be stored inside the member 23 between these bearings, if desired, as above described.

While each of the antifriction bearings is shown as sealed only on one side thereof, it is obvious that it may be sealed on both sides thereof.

In the operation of the reel shown in Figures 3 to 5, inclusive, rotation of the reel drive shaft 15 causes concentric reel member 17 mounted thereon to rotate, whereupon contact of the bar members 19 of concentric reel member 17 with bar members 20 of eccentric reel member 18 causes said eccentric reel member to rotate at the same angular speed about an axis offset from and inclined to the axis of rotation of the concentric member. The concentric reel member is thus the driving reel member while the eccentric reel member is the driven reel member. During such rotation, the offset relation of the reel members causes the thread in each turn to be transferred from the bar members of one reel member to those of the other reel member.

Simultaneously, the inclined relation of the reel members causes the thread turns carried by the reel members to travel bodily lengthwise of the reel so that the thread is advanced in a plurality of generally helical turns longitudinally of the reel. The amount that each thread turn advances during each revolution of the reel for a reel member of a given diameter is determined by the angle of inclination between the axes of the reel members. In the reel of Figures 3 to 5, inclusive, for the direction of rotation indicated in Figure 3 the thread will advance toward the unsupported end of the reel, which is the desirable direction of advance of the thread because of the advantages which arise from the use of cantilever reels.

In the embodiment of the invention shown in Figures 3 to 5, inclusive, the concentric reel member 17 mounted on reel drive shaft 15 is connected thereto for rotation therewith by means permitting relative rotation between the drive shaft 15 and the concentric reel member 17 in the event the torque between the two becomes greater than a predetermined amount.

Such means may conveniently take the form of a slip clutch 51 comprising a metallic insert 52 of polygonal cross section rigidly held in a corresponding recess in the reel member 17 by a snap ring 53 fitting into a suitable opening in said reel member. Said insert 52 is provided with diametrically disposed holes 54 into which, during driving engagement, the balls 55 which are disposed in a diametrical hole 56 in said drive shaft 15 are forced apart by spring 57 disposed between the balls. When the torque between the drive shaft and reel member 17 is less than a predetermined amount, the balls seat in said holes 54 in the insert 52 and cause reel member 17 to rotate in unison with drive shaft 15. When, however, the torque becomes greater than a predetermined amount, the balls are forced inwardly toward each other, moving out of the holes 54, thus permitting relative rotation between drive shaft 15 and concentric member 17.

The metallic insert 52, which, like the balls, is of some suitable wear-resistant metal, is formed with an internal annular race in which the balls 55 move when not seated in holes 54. Thus at all times, both when the balls are seated in holes 54 and when they are not in said holes but are seated in the above-mentioned annular race, the balls 55 serve to locate the concentric reel member 17 endwise on the drive shaft 15. Therefore, the clutch means 51 permits relative rotation between the drive shaft and concentric member 17 in the event of an increase of torque beyond a pretermined amount and also serves as means for locating said concentric member lengthwise of the drive shaft.

Accordingly, no nut or other means is required at the end of the drive shaft 15 to hold said concentric member on the drive shaft. Rather, the end of said concentric member can be sealed by means of a suitable cap 80 and thus the entrance of processing liquid or other media into the interior of the reel prevented. In the illustrated embodiment of the invention, the concentric reel member 17, which, as above indicated, may be formed of Bakelite, hard rubber or other synthetic resin, is provided with metallic bearing inserts 60 to prevent wear of the reel member during such time as it is rotating with respect to drive shaft 15.

Slip clutch 51 is extremely advantageous in preventing overloading of the reel members. In the event the torque becomes too great, the slip clutch 51 will permit slippage between the reel and its driving means. Furthermore, in starting and stopping the reel the slip clutch 51 is advantageous, since it permits the reel members to be started and stopped gradually. This is true even though the drive shaft 15 may be started or stopped almost instantaneously, as occurs, for instance, when a jaw clutch is employed for controlling the reel driving means.

The embodiment of the invention shown in Figure 8 is similar to that above described. In the reel of Figure 8, however, the front bearing 41a supporting the drive shaft 15 is of the antifriction type, comprising a needle bearing in which the rolls bear on the shaft. A needle bearing may advantageously be used at this point because it is of a sufficiently small external diameter to fit in the limited space available. The bearing may be of the self-lubricated type and, if desired, sealed at one or both of its ends, preferably at the end thereof adjacent the end of supporting member 23 in which it is disposed.

In this embodiment, moreover, the rear bearing 46a supporting the drive shaft 15 serves as the means for locating the drive shaft endwise with respect to the supporting member 23. Thus as shown in Figure 8 bearing 46a is located in supporting member 23 between shoulder 58 therein and a snap ring 59 located in a groove in the supporting member. The outer race of the bearing is thus located lengthwise with respect to said supporting member. The inner race of the bearing is located on said drive shaft 15 by means of collar 50 and snap ring 61 in a groove in said drive shaft. Therefore, the bearing serves as means for locating the shaft endwise of supporting member 23, wherefore the collar 50 shown in the previous embodiment may be omitted. If desired, the rear portion of the hub 22 of concentric reel member 17 may be extended to the rear, as shown, to provide an increased length of support of said member 17 on shaft 15. The bearing 46a may be easily removed by removal of snap rings 59 and 61 and collar 50.

The reels shown in Figures 3 to 5, inclusive, and Figure 8, may advantageously be assembled by first mounting the concentric member 17 on the reel drive shaft 15, thereafter attaching the flexible seal 32 to the hub of the member 17. The rotatable annular member 27 is then mounted on its bearings 39 and 40 on the projecting portion 38 of supporting member 23. Then the shaft 15 is inserted through its bearings in said supporting member 23, after which the rear collar 50 and drive gear 14 may be mounted on said shaft. The cage member 24 may then be mounted on annular member 27 by being passed over concentric member 17 from the front thereof and the assembly clamped together by T-bolts 28, the outer rim of the seal 32 being held between cage member 24 and member 27.

The reel of the present invention also embodies means for mounting the reel on the frame of the apparatus by means which permit the reel to be readily removed or replaced. As shown in Figures 4, 5 and 8, each of the above-described reels is provided with a circular flange member 62 fixed to supporting member 23 outside the annular supporting member 27. In these figures, flange member 62 is disposed at the rear of member 23 and is circular in cross section, being of a diameter somewhat larger than that of the driving gear 14. Flange member 62 is provided on its edge with an accurate locating surface 63 and on its rear face with an accurate locating surface 64 and is mounted in a recessed cooperating member fixed to the frame of the apparatus which cooperating member may take the form of cup member 65.

In the apparatus shown in the embodiments of Figures 1 to 8, inclusive, cup member 65 is disposed in a hole 67 formed in frame member 11, being welded to the frame member 11. The cup member 65 is provided at the top with a lug 80, which extends to the inclined frame member 11. Filler plates 66 are provided between the bottom of cup member 65 and the lug 80 on the cup member, and the frame member 11, whereby the cup member may be accurately jig-welded into position, as shown. The cup member 65 is provided with an accurately finished internal surface 68 adapted to cooperate with the edge surface 63 of the flange member 62. It is also provided with an accurately finished surface 69 on shoulder 70 in the cup member 65 cooperating with rear face 64 of flange 62. Furthermore, the shoulder 70 terminates in the edge of the hole 71 in the back portion of the cup, which hole is of a larger diameter than driving gear 14 but of a smaller diameter than the flange portion 62.

As shown in Figure 5, the sides of the cup member 65 are provided with lugs 72, each of which is threaded to receive a set screw 73. The set screws 73 are provided with frusto-conical ends 74 which bear against a tapered portion 75 of flange member 62. Consequently, when the set screws 73 are tightened, they hold the flange member 62, and consequently the reel member supported by member 23, firmly in place. The lugs 72 are disposed as shown so that the set screws are accessible from the back of frame member 11, the hole 67 being provided at its sides with recesses 76, as shown in Figures 5 and 7, to permit insertion of a tool to manipulate the set screws.

The cup members 65 shown may be cast, forged or stamped from plate metal, as desired. The surfaces 68 and 69 may be machined and the lugs 72 thereof threaded before the cups are welded to the frame of the apparatus. In the embodiments shown in the drawings, the cup members 65 are accurately jig-welded into position by means of filler plates 66. If desired, however, the cup members 65 may be fixed to the frame of the apparatus and machined in place or recesses may be formed in the frame of the apparatus to fit the mounting on the reel supporting member 23.

From Figures 4 to 8, inclusive, it is apparent that by merely loosening the set screws, the entire reel unit; i. e., the reel itself, the supporting member 23, and the driving gear 14, may be removed without disassembly of the reel or of any other portions of the associated apparatus. The bevel gears 13 and 14 for driving the reel are so formed that they can be separated as shown with no interference. This operation is illustrated in Figure 8, in which the reel is shown as partly removed. Figure 6 shows the front of the apparatus illustrated in Figures 3 and 8 after the reel has been removed; Figure 7, the cup member 65 as fixed to frame member 11, most of the associated apparatus being omitted.

The demountable mounting means above described makes it possible to remove the reel and its associated apparatus from the supporting means with a minimum of time and labor. This is extremely important in commercial installations, such as those for the manufacture of artificial silk thread by a continuous process wherein tens of thousands of reels are employed in a single plant. According to the illustrated apparatus, each reel can be removed after loosening the two set screws, after which another reel may, if desired, be inserted in its place. A minimum of operating time of the apparatus is lost; indeed, reels may be removed and replaced, if desired, without stopping the machine.

Referring now to other parts of the apparatus shown in Figures 1 to 8, the collecting troughs 5 are mounted on flanged plates 77 connected, as by a welding operation, to frame members 11. Each plate 77 supports the trough above it and provides a flange portion 78 to which the lower trough is bolted, as by bolts 79. Each trough, moreover, is provided with an opening in back member 81 thereof through which passes the hub portion 37 of the reel. In the apparatus shown, said opening is substantially larger than said hub portion and in it is disposed a cup-shaped member 82, which may be formed of rubber or other reagent-resistant material, having an annular rib 83 at the rear thereof as shown.

A cooperating flange 84, which may be of suitable reagent-resistant material such as rubber, is mounted on hub member portion 37 of the reel within said cup member 82. Should any processing liquid reach the rear portion of the reel, it is prevented from passing along the hub 37 to the rear bearings or cup mounting by means of flange 84. The liquid which drops or is thrown off said flange during rotation of the reel is caught by cup member 82 and returned to the coagulating trough. In effect, cup member 82 and flange 84 form a labyrinth seal.

Figures 9 and 10 show in elevation and plan, respectively, a modified reel embodying certain of the features of the present invention. As appears more particularly from Figure 9, the rear bearing 46b for drive shaft 15b is supported in a cross member 85 fixed to spaced side members 86 forming parts of reel supporting member 23b. Said side members 86, which terminate at the rear of the reel in a cross member 87, enclose driving gear 14b mounted on drive shaft 15b. As shown in Figure 9, drive shaft 15b is made hollow, being provided with an interior tubular member 88 making possible circulation to and from the interior of the reel of a heating medium for drying the thread on the reel, which for such purposes is preferably made of metal.

Cross member 87 forming part of frame member 23b is provided with a bore for shaft 15b. Upon cross member 87 is mounted member 89 providing the connections for supplying and removing the heating medium from the interior of the reel. Member 89 is divided into two compartments 91 and 92, with the former of which communicate tubular member 88 and lateral pipe 93. Suitable sealing means 94 prevent the passage of the heating medium except through tubular member 88. The other compartment 92 communicates with the interior of drive shaft 15b and with lateral pipe 95, suitable sealing means 96 being provided to prevent the escape of medium past drive shaft 15b. Lateral pipes 93 and 95 supply and remove the heating medium circulated through the reel.

The supporting member 23b, side members 86, cross member 87 supporting the seal housing 89, and member 85 carrying the bearing 46b are formed as a unitary structure as shown in Figures 9 and 10, being preferably cast in one piece. This feature of the invention provides a rigid support for the reel, for the sealing means in member 89, and for the drive gear 14b. All of the stated parts are thereby maintained in the desired accurate relationship to each other, in addition to which they may be readily attached to and detached from the frame of the machine.

In this embodiment of the invention, the reel supporting member 23b is provided with a flange portion 62b seating in cup member 65b which is fixed to the frame of the apparatus. Said cup member 65b is provided with an opening 71b therethrough which is of a diameter large enough to permit the passage of all of the apparatus back of said cup member 65b. Said cup member 65b is further provided with a shoulder 70b having a locating surface 69b thereon against which bears the surface 64b of flange member 62b, which is of a diameter larger than the largest dimension of the apparatus passing through said cup member and larger than the diameter of hole 71b. Flange member 62b is provided with accurately dimensioned edge 63b cooperating with an internal surface 68b in cup member 65b to locate the assembly as a whole.

As in the previously described embodiment of the invention, set screws 73b are threaded into lugs 72b at the sides of the reel to hold the flange members 62b in the cup member 65b. The points of the set screws 73b are frusto-conical in shape, as shown, for the purpose of cooperating with a tapered surface 75b on flange member 62b in order to hold said flange member firmly in place when the set screws are tightened. To remove the entire reel assembly shown in these figures, it is merely necessary to disconnect the pipes 93 and 95 and loosen set screws 73b, after which the reel itself, supporting member 23b, side members 86 and the portions of the apparatus supported thereby can be removed from the frame of the machine.

From the foregoing it is apparent that the invention makes possible thread-advancing reels which, because of the employment of antifriction bearings, require a very small amount of power, which require very little, if any, maintenance, and which can be readily removed and placed in the apparatus. The thread-advancing reels of the present invention therefore greatly reduce maintenance costs as compared with prior reels. The latter factor is extremely important in view of the great numbers of thread-advancing reels employed in the manufacture of thread, such as artificial silk thread, by the so-called continuous process, in which such thread-advancing reels are particularly useful.

It is apparent that the above-described embodiments of the invention are illustrative only and that various modifications may be made therein without departing in any way from the spirit of the invention. For example, while the flange portions by means of which the reels are mounted on the frame of the apparatus are in each case shown as circular, this because of the resulting ease of machining, it is apparent that the member on the supporting member on the reel and the cooperating recessed member on the frame of the apparatus may be characterized by configurations other than circular. Numerous other modifications may be made in the illustrated embodiments of the invention.

In the appended claims, the term "thread" is intended to include, besides thread per se, all other material capable of being advanced by devices of the type to which the invention pertains. It is not intended to restrict the invention as defined in the claims to devices for handling thread in the ordinary sense of the term. By "thread-handling apparatus" is meant, inter alia, apparatus of the type shown in Figures 1 and 2 with or without reels, as the context may require.

It is intended that the patent shall cover, by suitable expression in the appended claims, whatever features of patentable novelty reside in the invention.

What is claimed is:

1. Apparatus comprising a stationary frame member; a non-rotatable detachable supporting member carried by said frame member; a thread-advancing element rotatably carried by said supporting member, one of said members having a transverse shoulder thereon and the other having therein a cooperating recess adapted to receive said shoulder, said transverse shoulder and said cooperating recess encompassing said supporting member when it is in place on said frame member; and means for detachably holding said supporting member on said frame member so that said cooperating shoulder is received in said recess.

2. Apparatus comprising a non-rotatable supporting member; a thread-advancing thread store device rotatably mounted at one end of said supporting member, said thread store device including a rotatable driving element at the other end of said supporting member; and a stationary frame member having an opening therein large enough to permit passage of said driving element and provided with means to hold rigidly but detachably in place on said frame member the end of said supporting member with which said driving element is associated, whereby the subassembly comprising said thread-advancing thread store device, said supporting member, and said driving element can be removed without disassembly thereof from said frame member.

3. Apparatus comprising a supporting member; a rotatable member carried by said supporting member; a projecting shaft journalled in said supporting member; driving means connected to the projecting portion of said shaft; a transversely extending flange member fixed to said supporting member between said rotatable member and said driving means; a stationary frame member having a recess therein adapted to receive said flange member and locating means in said recess adapted to bear against said flange member, said recess and locating means defining an opening in said frame member sufficiently large to permit the passage of said driving means; and means for demountably holding said flange member against said locating means in said recess.

4. Apparatus comprising a rotatable member; a longitudinal supporting member carrying said rotatable member about one end thereof; a transversely extending flange member fixed to said supporting member intermediate the ends thereof; a stationary frame member having a recess therein adapted to receive said flange member and locating means in said recess adapted to bear against said flange member, said recess and locating means defining an opening in said frame member sufficiently large to permit the passage of said supporting member; and means for demountably holding said flange member against said locating means in said recess.

5. Apparatus comprising a thread-advancing thread store device; a supporting member for said thread store device having an external transverse shoulder thereon; a frame member having a recess therein adapted to receive said shoulder and locating means in said recess adapted to bear against the shoulder on said supporting member; and means for holding the shoulder on said supporting member against said locating means in said recess.

6. Apparatus comprising a thread-advancing thread store device; a supporting member carrying said thread store device having an external transverse shoulder thereon; a frame member having a recess therein adapted to receive said shoulder and an internally extending shoulder in said recess adapted to bear against the shoulder on said supporting member; and one or more set screws threaded through the wall of said recess in said frame member for holding the shoulder on said supporting member against the shoulder in said recess.

7. Apparatus comprising a thread-advancing thread store device; a supporting member carrying said thread store device; a flange member fixed to and extending transversely of said supporting member; a frame member having a recess therein adapted to receive said flange member and locating means in said recess adapted to bear against said flange member; and means for demountably holding said flange member against said locating means in said recess.

8. Apparatus comprising a thread-advancing thread store device; a supporting member carrying said thread store device comprising a transverse shoulder provided with a locating edge and a transverse locating surface; a frame member having therein a recess in which the locating edge of said shoulder fits closely and having in said recess a surface against which the transverse locating surface of said shoulder on said supporting member bears; and means associated with said recessed member for demountably holding said supporting member in position in said recess.

9. Apparatus comprising a thread-advancing thread store device; a supporting member carrying said thread store device; a flange member fixed to and extending transversely of said frame member, said flange member being provided with a locating edge extending therearound and a locating surface on one face of said flange member; a frame member having a recess therein in which the locating edge of said flange member closely fits and having in said recess a surface against which the locating surface on said flange member bears; and one or more set screws threaded into said frame member through the wall of said recess engaging the other face of said flange member to hold said flange member in position.

10. Apparatus comprising a thread-advancing thread store device; a supporting member carrying said thread store device; a flange member fixed to and extending transversely of said supporting member outside the limits of said thread store device, said flange member having a locating surface on one face thereof; a part carried by said supporting member and extending beyond said flange member away from said thread-advancing thread store device, said flange member being larger in at least one cross-sectional dimension than said part; a frame member having a recess therein adapted to receive said flange member and locating means in said recess adapted to have bear against said locating surface on said flange member, said locating means defining an opening through said frame member sufficiently large to permit the passage of said extending part carried by said supporting member; and means for holding said flange member in said recess so that its locating surface bears against said locating means.

11. A thread store unit which is capable of being detachably mounted on thread-handling apparatus, said thread store unit comprising a supporting member adapted to be demountably connected to said thread-handling apparatus; a cantilever thread-advancing thread store device mounted about one end of said supporting member; driving means for said device rotatably carried by said supporting member; and, connected to said driving means, a sprocket driving wheel disposed toward the other end of the supporting member and adapted to be driven from means mounted on said thread-handling apparatus.

12. A thread store unit which is capable of being detachably mounted on thread-handling apparatus, said thread store unit comprising a supporting member; a cantilever thread-advancing thread store device mounted about one end of said supporting member; a drive shaft for said thread store device journalled in said supporting member; a driving wheel for said thread store device mounted on said drive shaft adjacent the other end of said supporting member; and a flange member by means of which said supporting member is detachably connected to said thread-handling apparatus mounted on said supporting member between said thread store and said driving wheel, said flange member being larger in at least one cross-sectional dimension than the diameter of said driving wheel.

13. A thread store unit which is capable of being detachably mounted on thread-handling apparatus, said thread store unit comprising a supporting member; a cantilever thread-advancing thread store device mounted at one end of said supporting member; a drive shaft for said thread store device journalled in said supporting member; a driving wheel for said thread store device mounted on said drive shaft at the other end of said supporting member; and a circular flange member of a diameter larger than that of said driving wheel mounted on said supporting member between said thread store device and said driving wheel having a locating surface facing away from said thread store device.

14. A cup adapted to receive the flange member of the supporting member of the thread store unit described in claim 13, said cup having a circular recess therein of such diameter that said flange member closely fits therein, an annular shoulder in said recess adapted to bear against the locating surface on said flange member, an opening through said cup large enough to permit the passage therethrough of the driving wheel mounted at the end of said supporting member; and, threaded into said cup, one or more set screws for holding said flange member in the recess in said cup with the locating surface on one face thereof against the annular shoulder in said cup.

15. A cantilever reel for advancing thread in a plurality of generally helical turns comprising a supporting member mounted from one end only and including an enlarged portion adjacent its supported end and a reduced portion extending toward the unsupported end of said member; a shaft disposed in said supporting member and having a free end projecting therefrom; a bearing for said shaft in said supporting member adjacent the free end thereof; an antifriction bearing for said shaft disposed in the enlarged portion of said supporting member; spaced antifriction bearings mounted on the reduced portion of said supporting member about a common axis of rotation offset from and inclined to the axis of said shaft; a first reel member comprising a set of spaced, longitudinally extending bar members mounted coaxially with and upon said shaft; and a second reel member comprising a set of spaced, longitudinally extending bar members alternately disposed with respect to those of said first reel member rotatably carried by said spaced antifriction bearings, one end of the structure defined by said reel members being unobstructed by supporting means.

16. Apparatus of the character described in claim 15 in which each of said antifriction bearings is self-lubricating and is sealed on the face thereof nearest the end of said supporting member which said antifriction bearing is nearest.

17. Apparatus of the character described in claim 15 in which the bearing in said supporting member adjacent the free end thereof is an antifriction bearing.

18. A cantilever reel for advancing thread in a plurality of generally helical turns comprising a first rigid reel member including a set of spaced, longitudinally extending bar members, said reel member being provided with a projecting hub portion at the supported end of the reel; spaced antifriction bearings mounted in said hub portion; a longitudinally extending supporting member on which are mounted said spaced antifriction bearings, said member being supported from one end thereof only; a shaft journalled in said supporting member with its axis offset from and inclined to the axis of rotation of said first reel member; spaced bearings, at least one of which is of the antifriction type, disposed in said supporting member, said bearings rotatably carrying said shaft; and, mounted on said shaft, a second reel member including a set of spaced, longitudinally extending bar members alternately disposed to those of said first reel member, one end of the structure defined by said reel members being unobstructed by supporting means.

19. A cantilever reel for advancing thread in a plurality of generally helical turns comprising a longitudinally extending supporting member including a projecting end portion, and a flange portion spaced longitudinally of said supporting member from said projecting end portion; an antifriction bearing disposed in said flange portion; a shaft passing through the projecting end portion of said supporting member, said shaft being journalled in said antifriction bearing; driving means connected to said shaft on the side of the flange member opposite the projecting end portion of said supporting member; spaced antifriction bearings mounted on the projecting end portion of said supporting member about an axis of rotation offset from and inclined to the axis of said shaft; a first reel member comprising a set of spaced, longitudinally extending bar members mounted coaxially with and upon said shaft; a second reel member comprising a set of spaced, longitudinally extending bar members disposed alternately to those of said first reel member rotatably carried by said spaced, antifriction bearings, one end of the structure defined by said reel members being unobstructed by supporting means; a frame member having a recess therein adapted to receive said flange member and locating means in said recess adapted to bear against said frame member, said recess and locating means defining an opening sufficiently large to permit passage therethrough of said driving means; and means for demountably holding said flange member in said recess against said locating means.

20. Apparatus comprising a thread-advancing thread store device; a longitudinally extending support about one end of which said thread store device is mounted for rotation; a drive shaft for said thread store device, said drive shaft being rotatably mounted with respect to and projecting from the other end of said support; a first member, which is spaced from and extends longitudinally of the projecting end of said drive shaft, fixed to the end of said support from which said drive shaft projects; a second member, which is spaced from said support and extends transversely of said drive shaft, fixed to said first member; a first bearing associated with said support for rotatably supporting said drive shaft; a second bearing, spaced from said first-mentioned bearing, carried by said first member for rotatably supporting said drive shaft; and, connected to said drive shaft between said support and said second member, means for rotating said drive shaft.

21. Apparatus comprising a supporting member; a thread-advancing thread store device mounted at one end of said supporting member, said supporting member carrying at the other end thereof a part projecting away from said thread store device, a frame member adapted to rigidly support said supporting member, said frame member having an opening large enough to permit passage therethrough of said projecting part when said supporting member is mounted on said frame member; and means for detachably mounting said supporting member on said frame member comprising a transverse shoulder on one of said members adapted to fit in a corresponding recess in the other of said members.

22. Apparatus comprising a supporting member having a transverse shoulder thereon adjacent one end thereof and a part connected to said end of said supporting member projecting away from said supporting member; a thread-advancing thread store device mounted at the other end of said supporting member; a frame member having an opening large enough to permit passage therethrough of said projecting part and, associated with said opening, a recess adapted to receive the transverse shoulder of said supporting member; and means for detachably holding said supporting member with its transverse shoulder in said recess.

GEORGE P. TORRENCE.
RICHARD F. BERGMANN.
WALTER F. KNEBUSCH.

CERTIFICATE OF CORRECTION.

Patent No. 2,217,716.　　　　　　　　　　　　　　October 15, 1940.

GEORGE P. TORRENCE, ET AL.

It is hereby certified that error appears in the printed specification of the above numbered patent requiring correction as follows: Page 7, first column, line 20, claim 10, strike out "thread-advancing"; line 25, same claim, strike out the word "have"; line 42, claim 11, strike out "sprocket"; line 60, claim 12, after "store" insert --device--; page 8, second column, line 16, claim 21, strike out the comma and insert instead a semicolon; and that the said Letters Patent should be read with this correction therein that the same may conform to the record of the case in the Patent Office.

Signed and sealed this 10th day of December, A. D. 1940.

(Seal)

Henry Van Arsdale,
Acting Commissioner of Patents.